(12) United States Patent
Hyun et al.

(10) Patent No.: US 9,927,518 B2
(45) Date of Patent: Mar. 27, 2018

(54) APPARATUS FOR DETECTING LOCATION INFORMATION OF TARGET

(71) Applicant: Daegu Gyeongbuk Institute of Science and Technology, Daegu (KR)

(72) Inventors: Eu Gin Hyun, Daegu (KR); Jong Hun Lee, Daegu (KR); Cherl Hee Lee, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 428 days.

(21) Appl. No.: 14/708,310

(22) Filed: May 11, 2015

(65) Prior Publication Data

US 2016/0109565 A1 Apr. 21, 2016

(30) Foreign Application Priority Data

Oct. 21, 2014 (KR) .......................... 10-2014-0142308

(51) Int. Cl.
| | | |
|---|---|---|
| *G01S 13/42* | (2006.01) | |
| *G01S 13/34* | (2006.01) | |
| *G01S 17/32* | (2006.01) | |
| *G01S 17/42* | (2006.01) | |
| *G01S 13/58* | (2006.01) | |
| *G01S 15/34* | (2006.01) | |
| *G01S 15/42* | (2006.01) | |

(52) U.S. Cl.
CPC .......... *G01S 13/422* (2013.01); *G01S 13/343* (2013.01); *G01S 13/584* (2013.01); *G01S 15/34* (2013.01); *G01S 15/42* (2013.01); *G01S 17/325* (2013.01); *G01S 17/42* (2013.01)

(58) Field of Classification Search
CPC ...... G01S 13/347; G01S 13/38; G01S 13/931; G01S 7/032
USPC .......................................................... 342/146
See application file for complete search history.

(56) References Cited

U.S. PATENT DOCUMENTS

| | | | | |
|---|---|---|---|---|
| 7,911,386 B1 * | 3/2011 | Itoh | ...................... | H01Q 9/0407 |
| | | | | 343/700 MS |
| 2009/0027265 A1 * | 1/2009 | Zucker | ...................... | H01Q 3/22 |
| | | | | 342/368 |
| 2013/0069818 A1 * | 3/2013 | Shirakawa | ............. | G01S 13/347 |
| | | | | 342/146 |

FOREIGN PATENT DOCUMENTS

KR 10-1221570 1/2013

* cited by examiner

*Primary Examiner* — Timothy A Brainard
(74) *Attorney, Agent, or Firm* — Revolution IP, PLLC

(57) ABSTRACT

Disclosed is an apparatus for detecting location information of a target, comprising: a controller for setting the number of time slots to which a signal is transmitted, different center frequencies for each of the time slots, and an a bandwidth of the signal to be transmitted to each of the time slots; a transmitter using one transmitting antenna to transmit the set signal to each of the time slots; a receiver using a plurality of receiving antennas to receive a signal reflected from a target for each of the plurality of time slots; and a signal processor using the received signal to extract the location information of the target.

8 Claims, 5 Drawing Sheets

APPARATUS FOR DETECTING LOCATION INFORMATION OF TARGET

CROSS-REFERENCE TO RELATED APPLICATION

This application claims priority to and the benefit of Korean Patent Application No. 10-2014-0142308 filed in the Korean Intellectual Property Office on Oct. 21, 2014, the entire contents of which are incorporated herein by reference.

BACKGROUND OF THE INVENTION (a) Field of the Invention

The present invention relates to an apparatus for detecting location information of a target, and more particularly, to an apparatus for detecting location information of a target by which the number of transmitting or receiving antennas needed for detecting an angle of the target is reduced.

(b) Description of the Related Art

A radar, which is an acronym for radio detecting and ranging, is a wireless detection device that transmits an electromagnetic wave such as a microwave to a target, receives the electromagnetic wave reflected from the target, and determines a distance from, a direction of, an altitude of the target.

The radar uses a microwave of a wavelength of 10 cm to 100 cm that has a straight traveling property such as light since it has a short wavelength. Since the microwave is not reflected from an ionosphere, a radio wave emitted from a directional antenna travels straight to the target and is then reflected back to the antenna. Subsequently, a time for which the electromagnetic wave is reflected back may be measured to obtain information about a distance from, an angle with respect to, a speed of the target, and a terrain, formation of clouds, a location of an aircraft, etc. can be identified using the obtained information.

A tracking radar constantly measures coordinates of the target to identify movement of the target, and provides data for estimating the target's path and future location. In addition, a detecting radar has a low precision compared to the tracking radar, but has a long detecting range and allows an early detection of a distant target.

Generally, radars use a plurality of transmitting antennas and a plurality of receiving antennas to set a wide field of view (FOV).

Figure 1A:
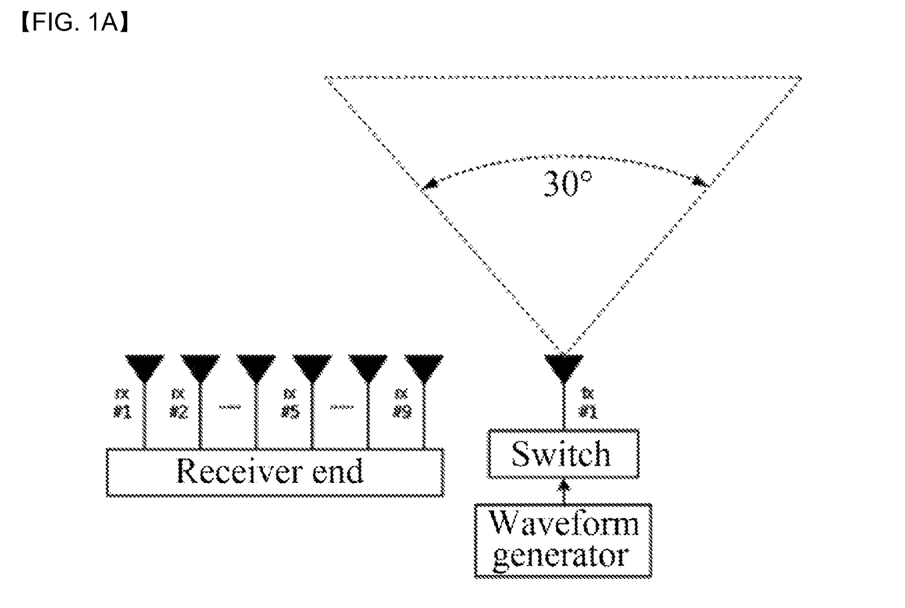
FIGS. 1A to 1C are drawings that illustrate antenna structures of a radar according to the conventional art.
Figure 1B:
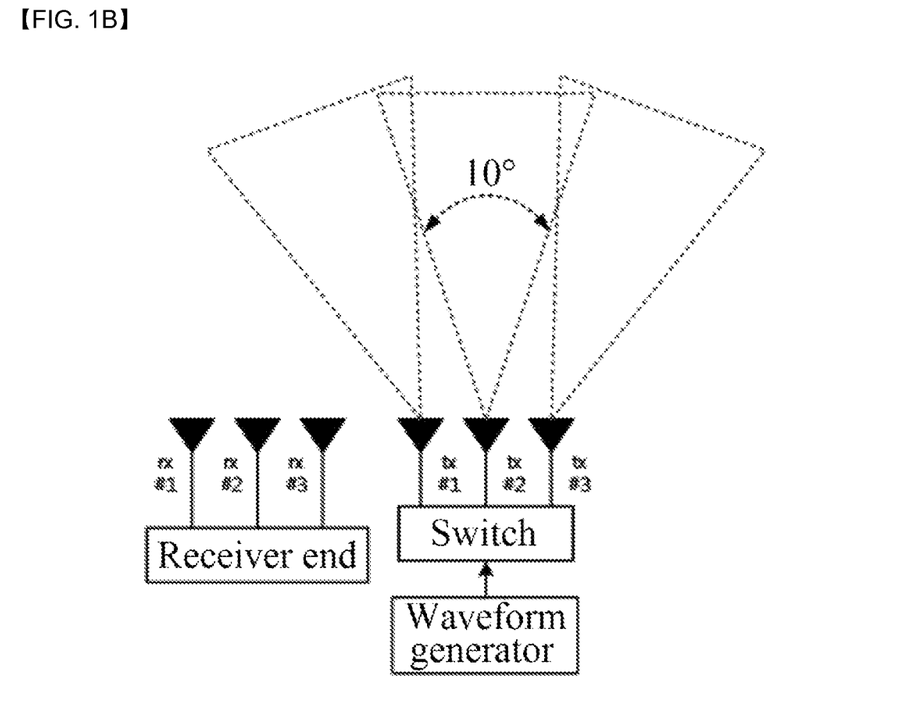
Figure 1C:
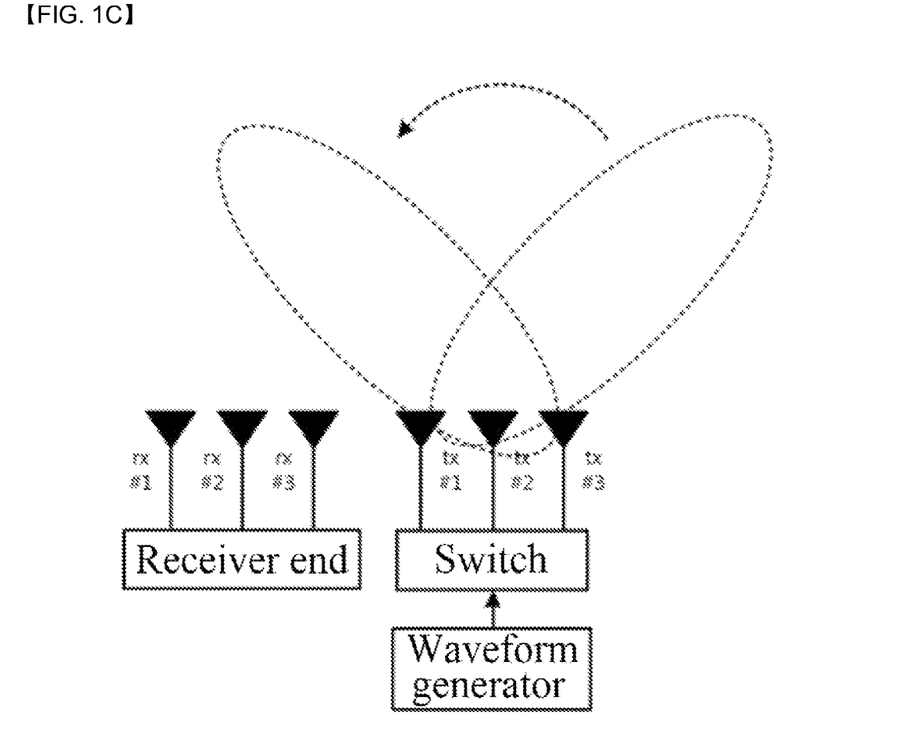

FIGS. 1A to 1C are drawings that illustrate antenna structures of a radar according to the conventional art.

First, FIG. 1A is a drawing that illustrates a method for using one transmitting antenna and a plurality of receiving antennas. If multiple targets are present within the same FOV when one transmitting antenna is used and, an error may occur during a process of identifying the targets. In addition, a large number of receiving antennas is required to improve detecting performance.

On the contrary, FIG. 1B is a drawing that illustrates a method for using a plurality of transmitting antennas and a plurality of receiving antennas. As shown in FIG. 1B, the respective transmitting antennas are set to have different FOVs and are selected by a switch after each time interval, and the selected antenna transmits the signal that is selected for the corresponding time slot. This method requires the plurality of transmitting antennas, and a very precise work of installation of the respective transmitting antennas is required for correct detection.

In addition, FIG. 1C is a drawing that illustrates an antenna structure of a radar using a digital beam-generating technique. This technique allows the transmitting antenna to transmits signals for electrical scanning, and is more flexible than the method illustrated in FIG. 1B. However, even this technique requires a plurality of transmitting antennas and a plurality of receiving antennas to improve detecting performance.

When a low frequency radar or an ultrasonic wave is used, the antenna increases a size of an entire radar system. The background technology of the present invention is disclosed in Korean Patent Application No. 10-1221570 (Jan. 14, 2013).

SUMMARY OF THE INVENTION

The present invention relates to an apparatus for detecting location information of a target, and more particularly, to an apparatus for detecting location information of a target by which the number of transmitting or receiving antennas needed for detecting an angle of the target is reduced.

In order to achieve such a technical object, an apparatus for detecting location information of the target according to an exemplary embodiment of the present invention includes: a controller for setting the number of time slots to which a signal is transmitted, different center frequencies for each of the time slots, and an a bandwidth of the signal to be transmitted to each of the time slots; a transmitter using one transmitting antenna to transmit the set signal to each of the time slots; a receiver using a plurality of receiving antennas to receive a signal reflected from a target for each of the plurality of time slots; and a signal processor using the received signal to extract the location information of the target.

The transmitting antenna may be made of a meta material, and a field of view (FOV) associated with a center frequency of the transmitting antenna may be predetermined by characteristics of the meta material.

The controller may set the plurality of time slots such that they have a time interval there between.

The plurality of receiving antennas may respectively have different phases.

The location information of the target may include at least any one of a distance from, an angle with respect to, and a speed of the target.

The signal may be a laser or ultrasonic wave signal.

An apparatus for detecting location information of a target according to another exemplary embodiment of the present invention includes: a controller for setting a center frequency and a bandwidth of a signal to be transmitted; a transmitter using one transmitting antenna to transmit the signal; a receiver using a plurality of receiving antennas to receive a signal reflected from the target; a filter unit for splitting the received signal into a plurality of signals with different center frequencies by using a plurality of filters; and a signal processor using the plurality of split signals to extract the location information of the target.

The filter unit may split frequency bands of the plurality of split signals such that they do not overlap each other.

Therefore, according to the present invention, by using the apparatus for detecting location information of the target, the receiving antenna receives the signal in the plurality of time slots, thereby reducing the number of the receiving antennas used in the radar system.

In addition, the FOV controlled by the plurality of transmitting antennas can be implemented with one transmitting antenna, thereby reducing the number of transmitting antennas used in the radar system.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Exemplary embodiments according to the present invention will now be described in detail with reference to the attached drawings.

Figure 2:
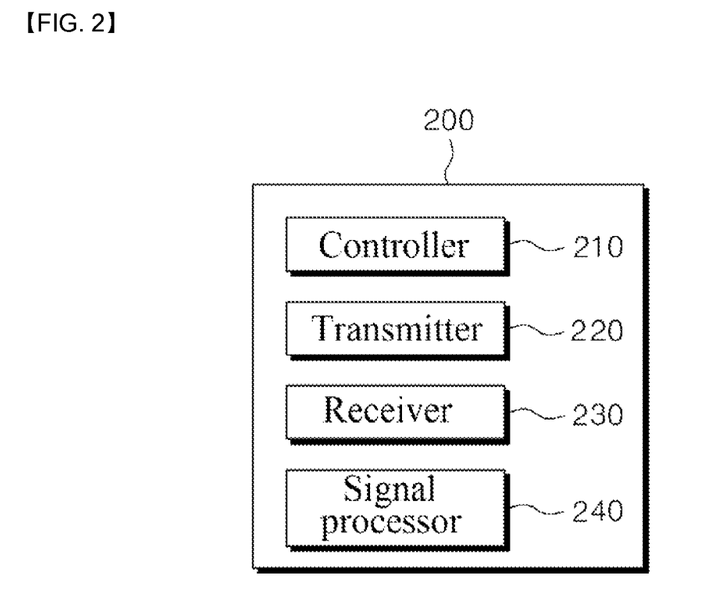
FIG. 2 is a block diagram showing a configuration of an apparatus for detecting location information of a target according to a first exemplary embodiment of the present invention.

FIG. 2 is a block diagram showing a configuration of an apparatus for detecting location information of a target according to a first exemplary embodiment of the present invention.

As shown in FIG. 2, the apparatus for detecting location information of the target according to the first exemplary embodiment of the present invention 200 includes a controller 210, a transmitter 220, a receiver 230, and a signal processor 240.

First, the controller 210 sets the number of time slots to which signals are transmitted and a time interval between the time slots. Next, it sets different center frequencies of the transmitted signals for respective time slots, and sets bandwidths of the signals.

Next, the transmitter 220 transmits the signals with the center frequencies and bandwidths that are set by the controller 210 for the number of the time slots. The transmitter 220 transmits the signal to obtain the location information of the target. In this case, the signal may be a laser or an ultrasonic wave.

In addition, the transmitter 220 may transmit the signal using at least one transmitting antenna, which is made of a meta material, and a FOV of the transmitting antenna is predetermined according to characteristics of the meta material.

In addition, the receiver 230 receives the signal reflected from the target for each of a plurality of time slots using a plurality of receiving antennas. In this case, the receiving antennas have respective different phases.

Finally, the signal processor 240 extracts the location information of the target using the signal that is received by the receiver 230. In this case, the location information may include at least any one of a distance from, an angle with respect to, and a speed of the target.

The apparatus 200 for detecting location information of the target according to the first exemplary embodiment of the present invention may detect the location information of the target by using a frequency modulation continuous wave (FMCW) type of radar in which a distance from the target is measured by mixing echo reflected from the target with some of the transmitting frequencies and then measuring a bit frequency. In addition, the apparatus 200 for detecting location information of the target according to the first exemplary embodiment of the present invention is applicable regardless of a modulation method of the signal that the transmitter 220 transmits.

The apparatus for detecting location information of the target according to the first exemplary embodiment of the present invention will now be described in more detail with reference to FIGS. 3 and 4.

Figure 3:
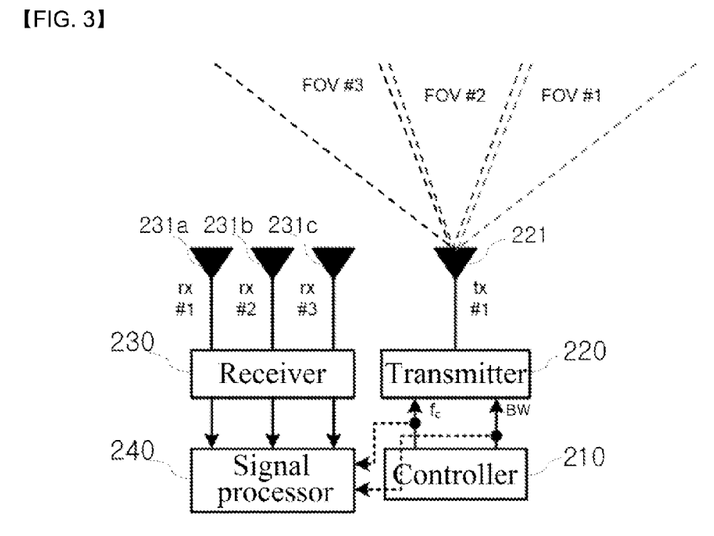
FIG. 3 is a drawing that illustrates the apparatus for detecting location information of the target according to the first exemplary embodiment of the present invention.

FIG. 3 is a drawing that illustrates the apparatus for detecting location information of the target according to the first exemplary embodiment of the present invention.

First, the controller 210 sets the number of time slots to which signals are transmitted and a time interval between the time slots. Next, it sets a bandwidth(BW) of the signal to be transmitted and sets different center frequencies ($f_c$) to the plurality of set time slots. The controller 210 transmits the set bandwidth (BW) and center frequencies $f_c$ to the transmitter 220. The controller 210 sets the center frequencies $f_c$ and the bandwidth (BW) such that the signals transmitted in each time slot use different frequency bands that do not overlap each other.

Next, the transmitter 220 transmits each of the signals with the set bandwidths(BW) and center frequencies $f_c$ from the controller 210 for the plurality of time slots. In this case, the transmitter 220 uses one transmitting antenna 221, and may transmit the signal using a plurality of transmitting antennas.

The transmitting antenna 221 made of a meta material is set to have FOVs that are set by the controller 210 for each of the center frequencies. When the transmitting antenna 221 of the transmitter 220 transmits a signal with a center frequency of $f_{c1}$, the transmitting antenna 221 has a FOV of FOV #1. When the transmitting antenna 221 transmits signals with center frequencies of $f_{c2}$ and $f_{c3}$, FOVs are respectively set to FOV #2 and FOV #3.

Figure 4:
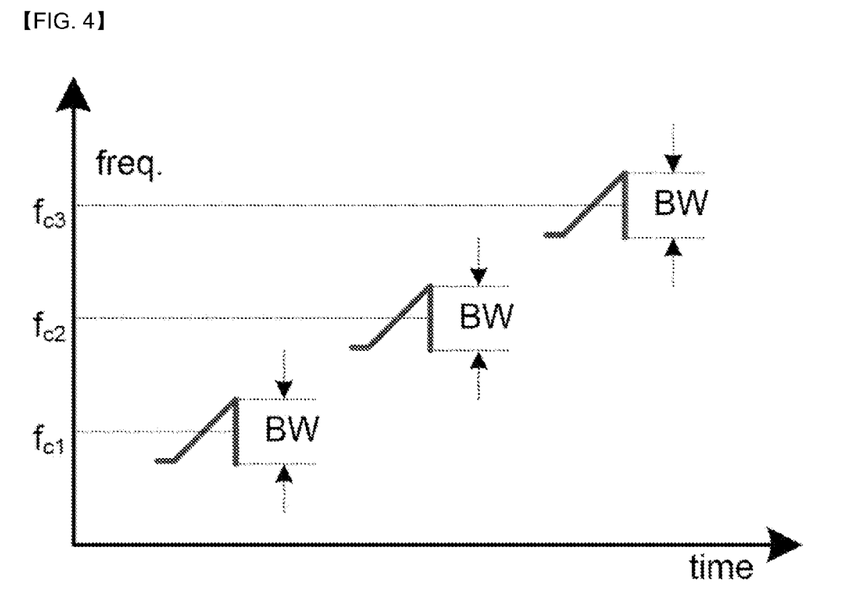
FIG. 4 is a graph showing how a waveform is constructed by transmitting antennas of the apparatus for detecting location information of the target according to the first exemplary embodiment of the present invention.

FIG. 4 is a graph showing how wave forms are controlled by the transmitting antenna of the apparatus for detecting location information of the target according to the first exemplary embodiment of the present invention.

As shown in FIGS. 3 and 4, it is assumed that the controller 210 sets the transmitting antenna 221 to transmit the signals in three time slots. The transmitter 220 transmits the signal with the center frequency of $f_{c1}$ in a first time slot. Next, it transmits the signal with the center frequency of $f_{c2}$ in a second time slot and the signal with the center frequency of $f_{c3}$ in a third time slot, and bandwidths(BW) of the signals are identical to each other.

In addition, after transmitting the signal in the corresponding time slot, the transmitter 220 transmits the signal of the next time slot after the time interval.

Next, the receiver 230 receives signals reflected from the target. In this case, the receiver 230 receives the signals reflected from the target for each of the time slots using a plurality of receiving antennas 231a, 231b, and 231c with respective different phases. The transmitter 220 transmits the signal by splitting it in three time slots, and the receiver 230 may receive nine signals if it has three receiving antennas 231a, 231b, and 231c.

That is, when the transmitter 220 transmits the signal by setting the FOV to FOV #1 in the first time slot, the receiver 230 receives the signal with the center frequency of $f_{c1}$ and the FOV of FOV #1 in the first time slot via the first, second, and third receiving antennas 231a, 231b, and 231c. In this case, there are phase differences between the signals that are received by the three receiving antennas 231a, 231b, and 231c.

The same way as in the first time slot, in the second and third time slots, three receiving antennas 231a, 231b, and 231c of the receiver 230 respectively receive the signals with the center frequencies of $f_{c2}$ and $f_{c3}$ and the FOVs of FOV #2 and FOV #3.

Next, the signal processor 240 extracts the location information of the target using the signals that are received by the receiver 230. In this case, the location information of the target includes at least any one of a distance, an angle with respect to, and a speed of the target.

The signal processor 240 receives information about the center frequencies $f_{c1}$, $f_{c2}$, and $f_{c3}$ and the bandwidths(BW) of the signals that are transmitted by the transmitter 220 for each of the time slots. Next, it receives the signals from the receiver 230 that are respectively received by the plurality of receiving antennas 231a, 231b, and 231c having different phases for each of the time slots.

The signal processor 240 detects the location information of the target by applying the information about the center frequencies $f_{c1}$, $f_{c2}$, and $f_{c3}$, the bandwidths(BW), and the signals received from the receiver 230 to an algorithm for detecting location information of the target.

As described above, by using the apparatus 200 for detecting location information of the target according to the first exemplary embodiment of the present invention, the number of the receiving antennas used in the radar system can be reduced since the receiving antennas receive the signals in the plurality of time slots.

An apparatus for detecting location information of a target according to a second exemplary embodiment of the present invention will now be described with reference to FIG. 5.

Figure 5:
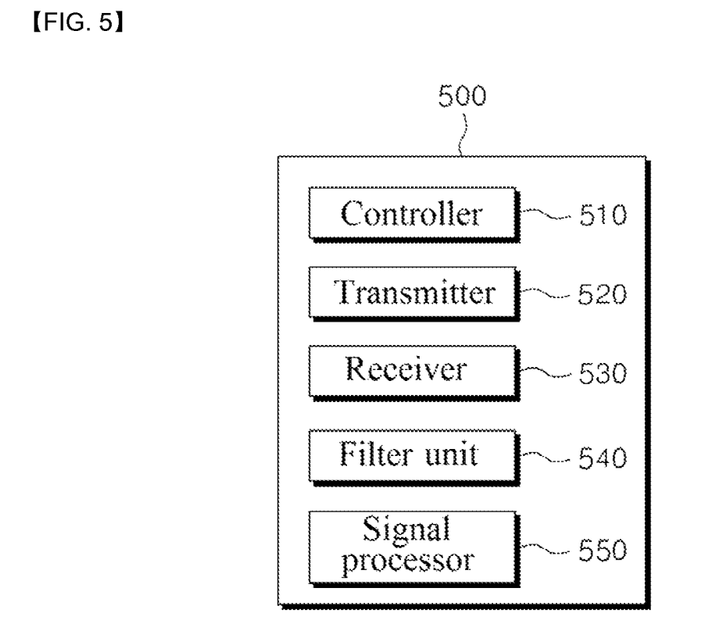
FIG. 5 is a block diagram showing a configuration of an apparatus for detecting location information of a target according to a second exemplary embodiment of the present invention.

FIG. 5 is a block diagram showing a configuration of the apparatus for detecting location information of the target according to the second exemplary embodiment of the present invention.

As shown in FIG. 5, the apparatus 500 for detecting location information of the target according to the second exemplary embodiment of the present invention includes a controller 510, a transmitter 520, a receiver 530, a filter unit 540, and a signal processor 550.

First, the controller 510 sets center frequencies and bandwidths of a signal that the transmitter 520 transmits. The apparatus 500 for detecting location information of the target according to the second exemplary embodiment of the present invention sets a wider bandwidth than the apparatus 200 for detecting location information of the target according to the first exemplary embodiment.

Next, the transmitter 520 simultaneously transmits the signals with the center frequencies $f_c$ and bandwidths(BW) set by the controller 510 using a transmitting antenna. In this case, the transmitting antenna is made of a meta material, and a FOV of the transmitting antenna is predetermined to correspond to the center frequency $f_c$ according to characteristics of the meta material.

Next, the receiver 530 receives a signal reflected from the target using a plurality of receiving antennas. In this case, the plurality of receiving antennas respectively have different phases.

In addition, the filter unit 540 splits the received signal into a plurality of signals with different center frequencies using a plurality of filters. In this case, the filter unit 540 splits frequency bands of the split signals such that the frequency bands do not overlap each other or are not omitted.

Finally, the signal processor 550 extracts the location information of the target using the plurality of signals that are split by the filter unit 540. In this case, the location information of the target includes at least any one of a distance from, an angle with respect to, and a speed of the target.

The apparatus 500 for detecting location information of the target according to the second exemplary embodiment of the present invention may detect the location information of the target by using a frequency modulation continuous wave (FMCW) type of radar in which a distance from the target is measured by mixing echo reflected from the target with some of the transmitting frequencies and then measuring a bit frequency. In addition the apparatus 500 for detecting location information of the target according to the second exemplary embodiment of the present invention are applicable regardless of a modulation method of the signal that is transmitted by the transmitter 520.

The apparatus for detecting location information of the target according to the second exemplary embodiment of the present invention will now be described in more detail with reference to FIGS. 6 and 7.

Figure 6:
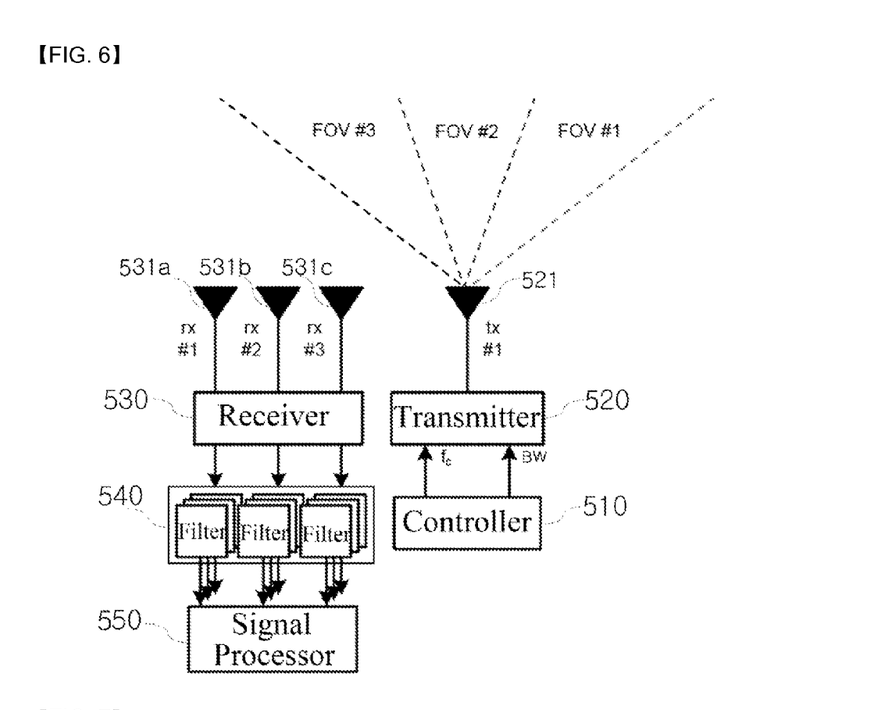
FIG. 6 is a drawing that illustrates the apparatus for detecting location information of the target according to the second exemplary embodiment of the present invention.

FIG. 6 is a drawing that illustrates the apparatus for detecting location information of the target according to the second exemplary embodiment of the present invention.

As illustrated in FIG. 6, the controller 510 sets a center frequency $f_c$ and a bandwidth(BW) of the signal to be transmitted, and transmits the set bandwidth (BW) and center frequency $f_c$ to the transmitter 520.

Next, the transmitter 520 transmits the signal with the set center frequency $f_c$ and bandwidth(BW) from the controller 510 at a time. In this case, the transmitter 520 uses one transmitting antenna 521, and may use a plurality of transmitting antennas to detect a wider FOV.

In addition, the transmitting antenna 521 is made of a meta material, and a FOV of the transmitting antenna 521 is assumed that it is predetermined to correspond to the center frequency $f_c$ in accordance with characteristics of the meta material.

Figure 7:
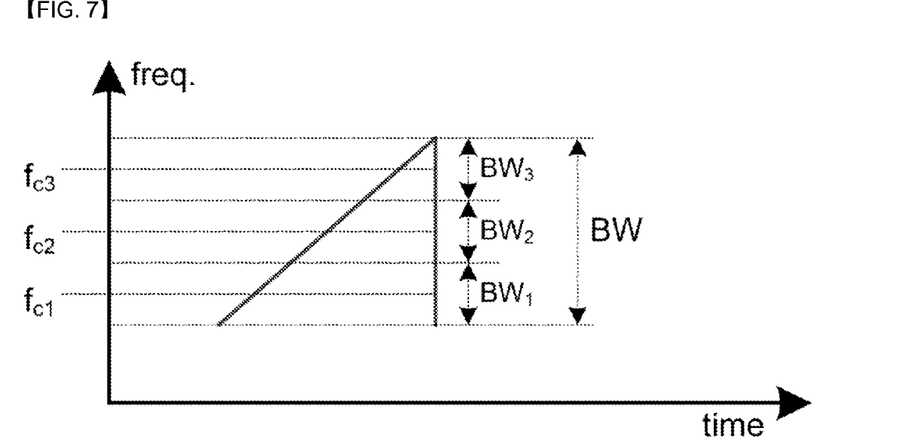
FIG. 7 is a graph showing how waveforms are controlled by the transmitting antennas of the apparatus for detecting location information of the target according to the second exemplary embodiment of the present invention.

FIG. 7 is a graph showing how waveforms are controlled by the transmitting antennas of the apparatus for detecting location information of the target according to the second exemplary embodiment of the present invention.

As shown in FIG. 7, the transmitter 520 of the apparatus 500 for detecting location information of the target according to the second exemplary embodiment of the present invention transmit the signal with a wide bandwidth at a time.

Next, the receiver 530 receives a signal reflected from the target using a plurality of receiving antennas 531a, 531b, and 531c. In this case, the receiving antenna 531a, 531b, and 531c have different phases, respectively.

In addition, the filter unit 540 processes the signal received by the receiver 530 using a plurality of filters. The filter unit 540 processes the signal using the filters corresponding to multiples of the number of the receiving antennas 531a, 531b, and 531c of the receiver 530. In this case, the filters may be a low pass filter (LPF), band pass filter (BPF), or high pass filter (HPF).

The filter unit 540 may split the received signal into a plurality of signals having a plurality of center frequencies using the BPF. As shown in FIG. 7, the filter unit 540 may split the signal into three signals with center frequencies of $f_{c1}$, $f_{c2}$, and $f_{c3}$ and bandwidths of $BW_1$, $BW_2$, and $BW_3$ using three BPFs.

Alternatively, the filter unit 540 may split the signal into three signals with center frequencies of $f_{c1}$, $f_{c2}$, and $f_{c3}$ and bandwidths of $BW_1$, $BW_2$, and $BW_3$ using the LPF, the BPF, and the HPF.

Finally, the signal processor 550 extracts the location information of the target using the plurality of signals that are split by the filter unit 540. In this case, the location information of the target includes at least one of a distance from, an angle with respect to, and a speed of the target.

The signal processor 550 receives information about the center frequencies $f_c$ and bandwidths(BW) of the respective signals from the filter unit 540, applies the received information, as well as the split signals, to the algorithm for detecting the location information of the target, thereby detecting the location information of the target.

As described above, by using the apparatus 500 for detecting location information of the target according to the second exemplary embodiment of the present invention, the received signal can be split into the plurality of signals using the filters, such that one transmitting antenna 521 is set to have the wider FOV. Accordingly, the number of transmitting antennas used in the radar system may be reduced.

According to the conventional art, the transmitting antenna transmits a signal having a FOV of 30°, as shown in FIG. 1A, the nine receiving antennas rx#1 to rx#9 are installed at intervals of 10/3° to detect the location information of the target.

In addition, as shown in FIG. 1B, when a radar system is implemented using three receiving antennas, three transmitting antennas tx#1 to tx#9 having field of view (FOV) of 10° are installed at intervals of 10/3° to detect the location information of the target in the prior art. In this case, in order for three of the transmitting antennas tx #1 to tx #9 to transmit the signal by precisely splitting the FOVs, the transmitting antennas should be precisely installed.

However, in the apparatus for detecting location information of the target according to the first exemplary embodiment of the present invention 200, the transmitting antenna transmits the signal in three time slots by splitting the FOV by 10°, the three receiving antenna 231a, 231b, and 231c are installed at the intervals of 10/3° to detect the location information of the target. That is, the same FOV may be detected using the three receiving antennas 231a, 231b, and 231c that are smaller in numbers than in the conventional method in which nine receiving antennas rx#1 to rx#9 are used to detect the location information of the target.

In addition, in the apparatus 500 for detecting location information of the target according to the second exemplary embodiment of the present invention, one transmitting antenna transmits the signal in the FOV of 30° at a time, and the signal received after being reflected from the target is split into the plurality of signals having the different center frequencies $f_{c1}$, $f_{c2}$, and $f_{c3}$ by using the filters of the filter unit 540.

Accordingly, when the radar system is implemented by using a smaller number of receiving antennas, one transmitting antenna 521 may be used to detect the same FOV, compared to the conventional method in which the number of transmitting antennas needs to be increased. In addition, since one transmitting antenna 521 is used, a conventional burden of having to precisely install a plurality of transmitting antennas tx#1 to tx#9 can be reduced.

The apparatuses 200 and 500 for detecting location information of the target according to the exemplary embodiments of the present invention may be implemented as a radar using a laser or ultrasonic wave signal or a lidar (light detection and ranging), and are applicable to a tracking or detecting radar. In addition, the apparatuses 200 and 500 for detecting location information of the target may be used for communication and weather, and may be used as a device for front, rear, and lateral sides detection. In addition, they are applicable to a sound navigation and ranging (sonar) for detecting targets under the sea, a magnetic anomaly detector (MAD), etc.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 200, 500: apparatus for detecting location information of target
210, 510: controller                220, 520: transmitter
221, 521: transmitting antenna      230, 530: receiver
231a, 231b, 231c, 531a, 531b, 531c: receiving antenna
240, 550: signal processor          540: filter unit

What is claimed is:

1. An apparatus for detecting location information of a target, comprising:

a controller for setting a number of time slots to which a signal is transmitted,
setting different center frequencies for each of the number of time slots, and setting
a bandwidth of the signal to be transmitted to each of the number of time slots, a time interval being set between each of the number of time slots;
a transmitter using a single transmitting antenna to transmit the set signal to each of the number of time slots, the single transmitting antenna being made of a meta material, and a number of field of views (FOVs) associated with a center frequency of the single transmitting antenna is predetermined by characteristics of the meta material;
a receiver using a plurality of receiving antennas to receive a signal reflected from a target for each of the plurality of time slots; and a signal processor using the received signal to extract the location information of the target, wherein in response to detection of transmitting a first signal corresponding to a first time slot, the single transmitting antenna transmits a second signal corresponding to a second time slot according to the time interval, and the receiver receives the first and second signals subsequent to reflection of the target via each of the plurality of receiving antennas according to the first time slot and second time slot, wherein a phase being different between the first signal and the second signal.

2. The apparatus of claim 1, wherein the plurality of receiving antennas respectively have different phases.

3. The apparatus of claim 1, wherein the location information of the target includes at least any one of a distance from, an angle with respect to, and a speed of the target.

4. The apparatus of claim 1, wherein the signal is a laser or ultrasonic wave signal.

5. An apparatus for detecting location information of a target, comprising:

a controller for setting a center frequency and a bandwidth of a signal to be transmitted;

a transmitter using a single transmitting antenna to transmit the signal, the single transmitting antenna being made of a meta material, and a number of field of views (FOVs) associated with a center frequency of the single transmitting antenna is predetermined by characteristics of the meta material;

a receiver using a plurality of receiving antennas to receive a signal reflected from the target, the plurality of receiving antennas respectively having different phases;

a filter unit for splitting the received signal into a plurality of signals with different center frequencies by using a plurality of filters; and a signal processor using the plurality of split signals to extract the location information of the target, wherein in response to detection of transmitting a first signal corresponding to a first time slot, transmitted from the single transmitting antenna, the single transmitting antenna transmits a second signal corresponding to a second time slot according to the time interval, and the receiver receives the first and second signals subsequent to reflection of the target via each of the plurality of receiving antennas according to the first time slot and second time slot, wherein a phase being different between the first signal and the second signal.

6. The apparatus of claim 5, wherein the filter unit splits frequency bands of the plurality of split signals such that they do not overlap each other.

7. The apparatus of claim 5, wherein the location information of the target includes at least any one of a distance from, an angle with respect to, and a speed of the target.

8. The apparatus of claim 5, wherein the signal is a laser or ultrasonic wave signal.

* * * * *